Patented June 8, 1954

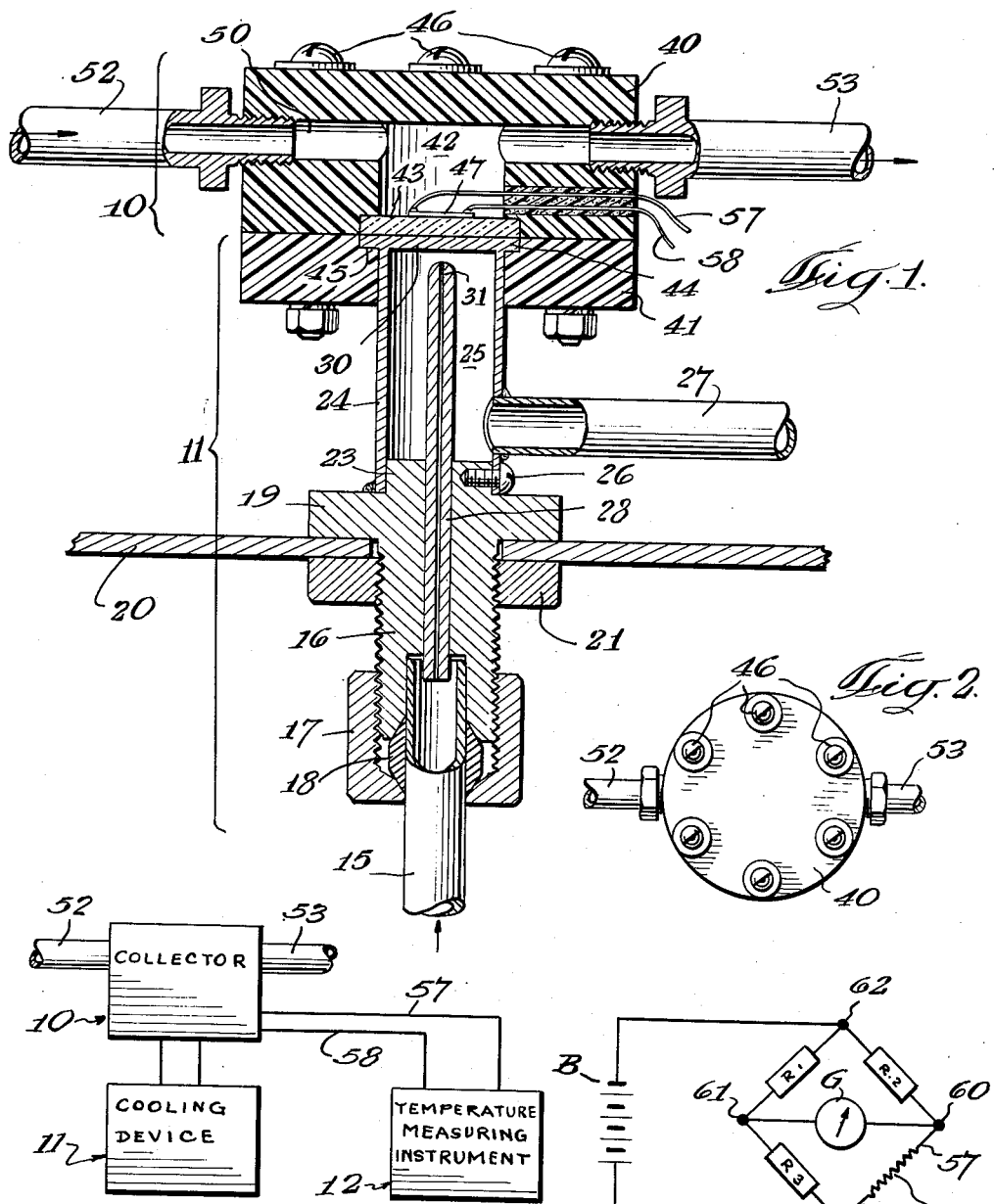

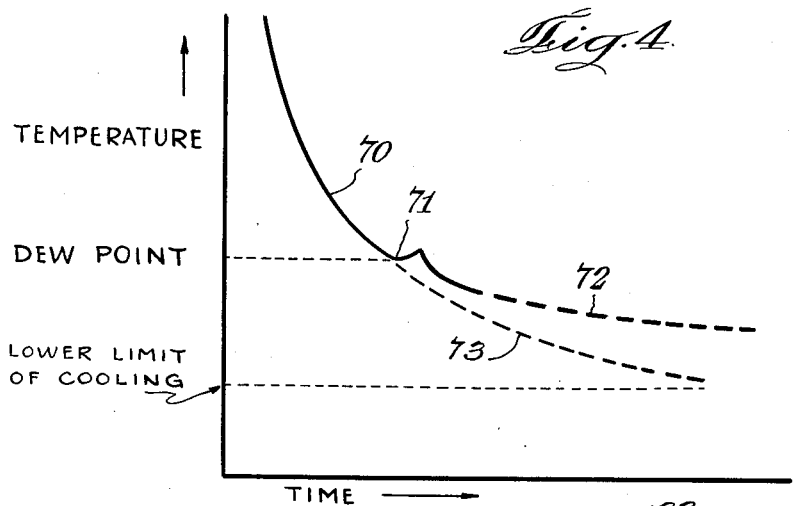
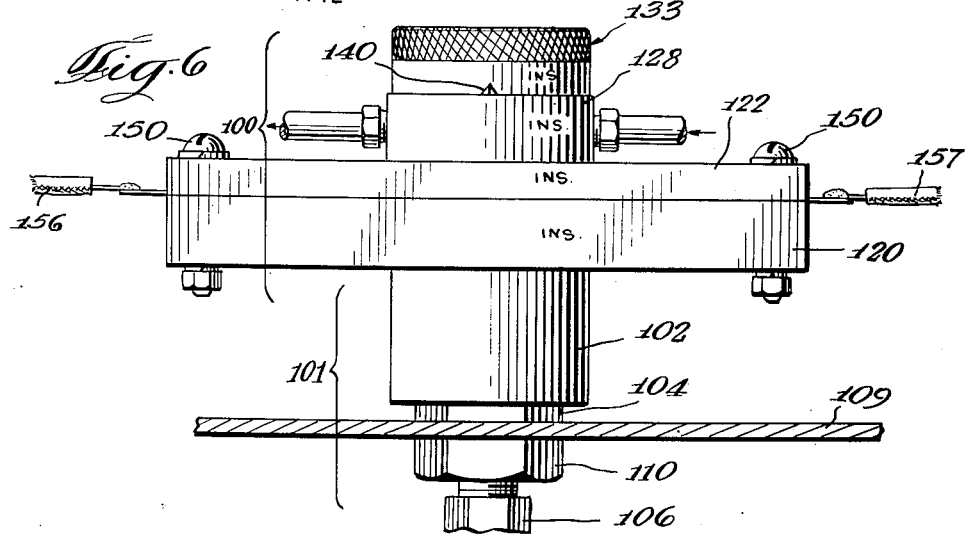
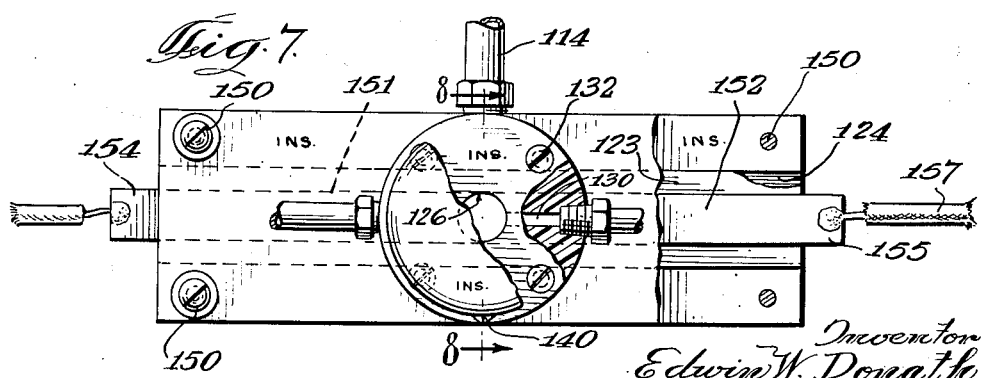

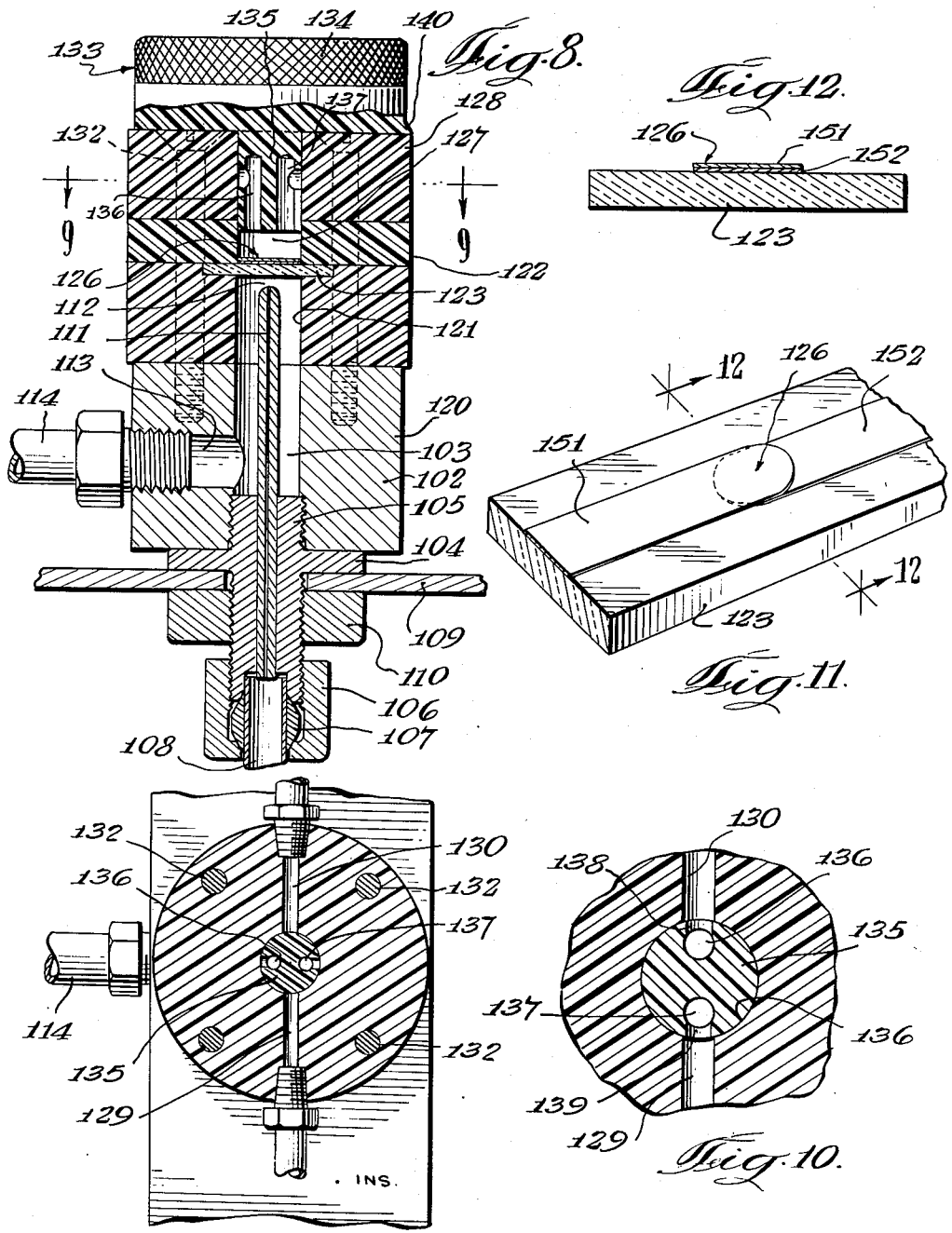

2,680,371

UNITED STATES PATENT OFFICE 2,680,371

DEW POINT MEASURING DEVICE

Edwin W. Donath, Chicago, Ill., assignor to Illinois Testing Laboratories, Inc., Chicago, Ill., a corporation of Illinois Application July 13, 1951, Serial No. 236,559

17 Claims. (Cl. 73—17)

This invention relates generally to dew-point determining apparatus or meters as they are termed, and more particularly is concerned with a device for measuring accurately and precisely the dew-point of a gas by means independent of the observers visual powers of perception of moisture condensate.

In many industries and as well in laboratories and the like it is of importance to determine the precise dew-point, either of a given gas sample or the atmosphere. This determination enables one readily to calculate or ascertain through the use of tables (and additional physical data measured or known) the moisture content of the sample or of the air. To the best of my knowledge, the methods and apparatus heretofore devised have depended upon the observer seeing a deposit of dew upon a mirror, i. e., a highly polished metal surface whose temperature is slowly lowered beyond the dew-point; or in other cases the method is based upon the creation of a visible vapor. The amount of vapor or dew required to be seen by the eye, even with optical instruments, is considerably greater than the amount of moisture contained in the first few molecules of condensation that occur when the temperature of a gas is lowered beyond the dew-point. It is pointed out that the dew point is defined as the temperature at which the quantity of vapor present in a gas saturates the same so that the lowering of the temperature thereof a scintilla below that temperature will cause condensation to begin. The more accurately that one can detect the instant that condensation begins, the more precise will be the determination of dew-point.

The principal objects of this invention are substantially co-extensive with the principal objects of the invention described in co-pending application Serial No. 233,051, filed June 22, 1951, and entitled Dew Point Measuring Device, now U. S. Letters Patent 2,649,707, of which I am a joint applicant with Bruce A. Ritzenthaler, and said application being assigned to the same assignee as the instant application. Such objects include: to provide a dew-point measuring device or instrument which will give accurate and reliable measurements of the dew-point by means independent of the visual powers of the observer to detect a vapor or film of dew; to provide such apparatus which will enable the dew-point to be determined with extremely early condensation of moisture; and to provide an apparatus which operates on principles different from those governing previous dew-point detecting devices.

The principle of operation of this invention while parallel to the extent inferred by the above substantially common objects, is entirely different therefrom. It may be said that the invention described and claimed in said co-pending application is simple and requires very little apparatus, but nevertheless, the invention herein described is more simple and requires basically less apparatus.

The instant invention operates on the principle which generally can be discussed by reference to the latent heat of vaporization. It is known that accompanying any basic change of state of matter there is usually a transfer of heat. In the case of water this is most common, and the phenomena are well-known. When water in a liquid state is converted into water into a vapor state, there is a transfer of heat to the vapor, and the vapor is said to have latent heat, in an amount which has been accurately calculated by physicists, and which is known. The existence of this heat is not manifest until and unless the vapor changes its state, and for example, when the vapor turns into a liquid once more, by condensation, this heat is given up.

The amount of such heat can be considered the heat of condensation, because it is given up upon condensation. It is of course the same as the latent heat of vaporization referred to above, and the heat produced is the basis for my invention. If a mirror surface is subjected to gas flow the dew-point of which it is desired to determine, and the temperature of the mirror surface slowly is lowered, there will be a temperature at which the dew or condensate will begin to deposit upon the surface. At the instant that the first few molecules are deposited, the vapor will commence giving up its heat of vaporization and tend to raise the temperature of the surface simultaneously that it is being lowered by the cooling means. I have discovered that by making the mirror of suitable mass, i. e., extremely small compared with the kind of condensate collectors heretofore used for visual determination, and by cooling same quite slowly, I can detect the rise of temperature thereof due to the giving up of heat of vaporization.

It is therefore, an important object of my invention to provide apparatus for utilizing the principles set forth above.

A further object of the invention is to provide simple apparatus whereby to enable the mirror or moisture collector to be cooled slowly; novel temperature detecting means; and novel apparatus for providing a practical embodiment of the invention.

My invention gives rise to many advantages and desirable results not readily apparent from a perusal of the above objects, and which results may perhaps be considered indirectly flowing from the invention. For example, my apparatus enables direct reading of the dew-point and hence simplify use and minimize the skill required of the observer; my apparatus is such as readily to be adaptable to portable instruments of small size and light weight; my apparatus requires no complicated power supplies, no complicated or expensive pumps or valves or other conduit systems. These and other advantages will occur to those skilled in the art as the description proceeds.

As required by the patent statutes I have fully and carefully set forth practical embodiments of apparatus suitable for carrying out the invention and I have explained the same in some detail so that my advance in the arts and sciences to which the invention pertains will be apparent.

In the drawings,

Fig. 1 is a vertical sectional view taken through a dew-point measuring device of simplified construction according to my invention.

Fig. 2 is a top plan view of the same.

Fig. 3 is a block diagram of the basic elements of my invention, showing their association.

Fig. 4 is a graphical representation of temperature of the moisture collecting element of my apparatus as a function of time, illustrative of and referred to in describing the principles of my invention.

Fig. 5 is a circuit diagram of a simple bridge for measuring the temperature of the moisture collecting element.

Fig. 6 is a side elevational view of a form of the invention of slightly different construction from that shown in Fig. 1.

Fig. 7 is a top plan view of the dew-point measuring instrument of Fig. 6 with portions broken away to show the constructional details.

Fig. 8 is a sectional view taken through the dew-point measuring device along the line 8—8 of Fig. 7 and in the direction indicated.

Fig. 9 is a sectional view taken through the device along the line 9—9 of Fig. 8 and in the direction indicated.

Fig. 10 is a fragmentary sectional view similar to that of Fig. 9 showing the open position of the chamber valve.

Fig. 11 is a fragmentary perspective view of the thermal retarder plate and the moisture collecting means of the device of Fig. 6.

Fig. 12 is a sectional view through the retarder plate along the line 12—12 of Fig. 11 and in the direction indicated.

As stated hereinabove, the basic physical principle out of which my invention arises is that when water vapor changes into condensate, the latent heat of vaporization thereof becomes manifest. It is obvious that the amount of vapor which is involved herein is extremely small, and hence, the amount of heat involved is also small—so small, that it has never to the best of my knowledge been utilized in the manner I have proposed. One of the principal reasons for this may be, although I am not certain that the thought has even occurred to others, that the amount of heat removed from a moisture collector, or "mirror" as it is termed, during cooling is so great, and occurs at such a rate, that the insignificant change thereof due to the evolvement of the latent heat of vaporization during deposit of dew has not been deemed capable of measurement.

Therein lies another important feature of my invention. I use a moisture collector which is of low mass and mount the same upon a good thermal insulator so that the loss of heat therefrom occurs at a very slow rate. Thus, when the temperature of the moisture collector is raised, which occurs the moment a few molecules of moisture are deposited, the change in rate of cooling is observable by instruments of suitable sensitivity. In addition, the problem of measurement of temperature is solved by constituting the moisture collector and element of the measuring instrument. In other words, the moisture collector is a thermocouple, or temperature resistance element. In this manner the moisture collector cannot serve as a thermal reservoir to mask the delicate temperature changes occasioned by the deposit of moisture.

Referring now to the figures, the dew-point measuring apparatus consists of a number of parts shown in the block diagram of Fig. 3. These are designated generally 10, 11, and 12 and consist respectively of the collector, the cooling device, and the temperature measuring instrument. The designation "collector" is a general one here, since it is used to refer to the entire housing, chamber, etc., as presently will become apparent. The appellation "mirror" applied to the metal element upon which the moisture collects by common usage is not totally suitable since it is not required that the element have reflective qualities. This was associated with the old methods and apparatuses utilizing visual detecting means. It is believed more accurate to refer to same as "moisture collector," "moisture collecting means" or "moisture collecting element" and such designations will be used throughout the specification and claims in preference to "mirror" and likewise to distinguish same from the designation "collector" which is a composite structure.

The cooling device 11 could be a refrigerating expansion valve, a brine solution, a coil carrying coolant, etc.

The temperature measuring instrument 12 is not intended to be a device completely apart from the collector 10. It is intended in the preferred embodiments of the apparatus of the invention that the temperature detecting element be included in the collector 10. Thus, the collector may house a thermocouple for use with a suitable galvanometer system; it may house a resistance element for use with a temperature bridge. The invention contemplates also that the collecting means in the collector need not be an element of the temperature measuring apparatus in which case auxiliary temperature measuring means will be associated therewith in the form of highly sensitive temperature detecting devices.

In Figs. 1 and 2 I have illustrated a simplified construction the upper part of which is the collector 10 and the lower part of which is the cooling device 11. In this case the cooling device is a simple expansion valve or jet which expands carbon dioxide or other refrigerative gas to lower the temperature of the moisture collecting means. The inlet tube 15 of relatively large diameter brings the refrigerative gas from a tank or other source to the fitting 16. The tube 15 is secured to the fitting 16 by a compression coupling of any suitable construction, comprising for example the gland 17 screwed onto the fitting and having the malleable member 18 to secure the joint. The fitting 16 has an upper flange 19 which overlies the mounting bracket 20 to which the entire assembly is secured. The bracket 20 may be a part of the instrument chassis or any other suitable standard mounting device. It could be a case housing the temperature measuring instrument 12, for example.

A nut 21 clamps the fitting 16 to the bracket 20. The fitting 16 has a projection 23 which fits into a cylindrical metal member 24 forming the expansion chamber 25. The cylindrical member 24 is fixed by a set screw 26. A conduit 27 comprising an outlet for the expanded refrigerant is brazed or welded to the side of the cylinder 24. A fine tube 28 passes from the end of the inlet tube 15 through the nut 16 up to the top of the chamber 25 where its efflux will impinge against the target which comprises the cap 30 of the cylinder 24. Obviously the upper end of the tube 29 comprises a refrigerating expansion valve or jet because the refrigerant is compressed upon entering the bottom of the tube 28 and suddenly expanded upon leaving the upper end of 31 causing the gas to lose heat according to well-known principles.

I have conveniently used a capillary tube for the member 28.

Thus far I have described the cooling device 11 which, as has been stated, is described only by way of illustration, since any suitable cooling device is its equivalent. The cylinder 24 and the cap 30 may be made of any suitable material, the cap or target serving as a diffuser to keep the flux substantially uniform throughout its extent so as not to give rise to temperature gradients in the moisture collecting means. As will shortly become apparent, the precaution requiring the use of a diffusing member such as target 30 is minimized or even eliminated by structure I have provided and described in connection with the instrument of Figs. 6 to 12, inclusive.

The collector 10 is firmly secured to the top of the cylinder 24 in any suitable manner. However, since the cap or target 30 is the source of cooling for the moisture collecting means this portion of the cooling device 11 is arranged juxtaposed to the said collecting means. Thus the collector 10 consists of a cylindrical casing 40 clamped to the top of the cylinder 24 by means of a washer or annular plate 41. The upper or outside face of the casing 40 is imperforate and there is a central sample chamber 42 the bottom of which is closed off immediately above the target or cap.

The bottom of the chamber is closed off by means of a relatively thick disc 43 of insulating material which can be referred to as a thermal retarder. Its purposes are principally for slowing down the rate at which heat escapes from the moisture collecting means, and for mounting such means. I have had success with a disc 43 formed of glass, set into a suitable recess formed in the bottom of the casing 40 and with its lower surface flush with the bottom of the casing. Such lower surface is therefore in engagement with the upper surface of the cap 30 which is flanged as at 44 and is set into a suitable recess 45 provided in the washer or plate 41 so that said upper surface is flush with the upper surface of said washer. The casing and plate are clamped together by a plurality of bolts 46 passing completely through the same and held in place by the usual nuts and lock washers.

Disposed upon the retarder disc 43 is the moisture collecting means or element 47. In size, it is extremely fine and hence the drawing illustrates same in greatly exaggerated proportions. The approximate size of such moisture collecting means presently will be discussed, but suffice it to say at this point that same may consist of an extremely thin foil or deposit of metal suitable for use either as a thermocouple junction or a resistance element of a temperature bridge. For example same could comprise nickel or alloys thereof. The moisture collector 47 is bonded to the upper surface of the retarder member 43 in any suitable manner. For example, it may be deposited thereon by means of a vacuum vaporizing apparatus, or mechanically secured, it being necessary only that it be uniformly placed thereon.

The principles of operation of the apparatus require the effect of the cooling by the refrigerant in the chamber 25 slowly to be felt by the moisture collector 47, so that the temperature of the element comprising the moisture collector slowly will drop. The casing 40 and the annular washer 41 are therefore formed from any good thermal insulator which is suitable for working to provide the desired shape and which is durable in character. Many plastics have those properties.

The chamber 42 has an inlet port 50 on the left in Fig. 1 and an outlet port 51 on the right. These ports have inlet and outlet conduits 52 and 53 respectively connected thereto, and it is intended that the sample gas be conducted through the port 50 into the chamber 42 and released therefrom through the port 51. As the gas passes into the chamber 42 and the temperature thereof is lowered it is intended that the moisture gather upon the element 47 when condensation occurs at the dew-point.

In the case that the element 47 serves as a junction for a thermocouple, the junction will be connected at the same place on the element 47 and the wires 57 and 58 will be led through the side of the casing 40 as shown. In the case the moisture collecting means or element 47 serves as an arm in a resistance bridge, the wires 57 and 58 would be connected at opposite ends of the element 47. This is shown more or less diagrammatically in Fig. 1. The element 47 is therefore apparently a resistance element as shown. It is best formed as a long thin element and could be spiralled or tortuous to occupy little space, with the leads 57 and 58 at opposite ends thereof.

The use of the element 47 as a part of a thermocouple is believed obvious, and likewise the use of such element as a part of a bridge should be perfectly clear to those skilled in the art. In Fig. 5 I have shown a schematic diagram of a simple thermal bridge of the Wheatstone type in which there are four legs each having a simple resistive element. The legs $R_1$, $R_2$, and $R_3$ can be so chosen that the galvanometer G connected across the terminals 60 and 61 will indicate current flow calibrated to a desired temperature range for a suitable value of resistance of the element 47. Note that there is a source of current such as a battery B connected across the junctures 62 and 63, and the element 47 is inserted in the bridge by the leads 57 and 58. It is not deemed necessary further to illustrate the connection of the element 47 as a thermocouple junction.

The method of determining the dew-point will now be described, and it is emphasized that the method is unchanged irrespective of the manner in which the element 47 is used. First the sample of gas is permitted to pass through the chamber 42 and simultaneously the temperature of the moisture collecting means 47 is lowered by subjecting same very slowly to the effect of the refrigerating chamber 25. The heat from the element 47 slowly will be drawn through the glass retarder plate 43. While this is occurring, the temperature smoothly will drop along the line 70 of the graph of Fig. 4 at first at a high rate and then slower. This gradual change will be accompanied by a gradual change of indication of the particular meter used for temperature determination. For example, the galvanometer of the circuit of Fig. 5 will indicate this gradual drop.

While the temperature of the element 47 is dropping along a smooth line, the gas temperature is also dropping, and there is no moisture condensing, but the moment the dew point is reached the latest heat of vaporization will begin to leave the vapor. The mass of metal from which the element 47 is formed and the rate at which the heat is transmitted through the glass retarder plate 43 must be such that the heat acquired from the condensation of the first moisture will be sufficient to produce a change in the rate of temperature drop of the element 47. This will be manifest by a change in the rate of change of the temperature, i. e., a break in the smooth line of the graph as indicated at 71. This may take the form of a plateau or an upward rise of the graph. The instant this occurs marks the first addition of heat and marks precisely the dew-point. I have been able to obtain great accuracy by the apparatus described below.

The graph of Fig. 4 shows the extra plotted line along which cooling would occur if it proceeded as begun along the line 70. This is a broken line designated 72, which asymptotically approaches the lower limit of cooling. The actual line of cooling is represented by the line 73 which is shown broken because it is not readily determined. After moisture accumulates on element 47, the globules and mushy ice which form upset the temperature pattern. Theoretically the line 72 will follow along above the line 73 because of the added heat from further condensation. The dew point will be manifest upon a galvanometer for example by a sudden slowing down or stopping or reversal of the needle thereof.

The limitations of the above method and apparatus are obviously the ease with which the element 47 can be made at the size necessary, and the sensitivity of the instruments used. It is advantageous to use recording instruments which give a graphical representation as shown in Fig. 4 for permanent record.

The leads 57 and 58 are brazed or soldered to the moisture collecting element 47 and in view of the size of the element this is a delicate operation and requires careful technique. It is advisable mechanically to support the joint thereby produced against vibration and shock to prevent breakage.

In determining the physical size of the element 47, one must consider the specific heat of the metal to be used. From the heat of vaporization of water there can be calculated the minimum area required to give a given calorific value to produce a desired temperature change, which, when considered in connection with the physical limits of the element 47 enable the determination of its size. For example, for a few degree change in the temperature of a nickle element provided by a layer of condensate ten molecules thick it was determined that the element should be about .00005 inch thick. This element deposited upon a disc of glass approximately one sixteenth of an inch thick, and using the simple refrigerating system illustrated, gave detectable change in the rate at the dew point of air passing through the chamber 42. Detection was had by a simple thermocouple or bridge.

Certain additional requirements are met by apparatus described below which comprises a more practical construction for substantially universal use. For one thing, the addition of heat is greatly affected by turbulence of the air sample, and precautions are taken in such apparatus to prevent this. Also, the cooling effect upon the leads is minimized to isolate the actual junction and the chamber is made equal to the size of the said junction. Other advantages will be brought out as the description proceeds.

Referring now to Figs. 6 to 12 the apparatus depicted therein is suitable for manufacture in quantities and may be made rugged and durable. It is composed of the collector 100 and the cooling device 101, which, as in the case of the previously described device, may be any manner of cooling means. The cooling device is shown as a carbon dioxide gas expansion valve. Thus there is a cylindrical housing 102 having a central cylindrical chamber 103. There is a fitting 104 having an upper nipple portion 105 screw threaded into the bottom of the housing 102 and having a pressure coupling at the bottom comprising a gland 106, a pressure member 107, and a conduit 108 leading from a source of carbon dioxide gas. The fitting is mounted to the plate 109 by a nut 110. Said plate may be a part of a bracket or an instrument casing or any other support for the device. Centrally of the fitting 104 there is a small bore tube 111 which may be in the form of a capillary tube which permits the carbon dioxide to expand from the upper end 112 thereof into the chamber 103 to produce a refrigerating effect. At the side of the chamber 103 there is an outlet 113 leading to a conduit 114 or the like to draw off the spent carbon dioxide gas.

The portion 101 thus far described and comprising the cooling device can be any means suitable for lowering the temperature of the moisture collecting means to be described.

I will now describe the portion 100, the collector of the device. There is an elongate rectangular member 120 of high thermal insulating properties arranged above the housing 102 perpendicular thereto. There is a continuation of the refrigerating chamber 103 in the member 120 so that the tube 11 extends up into the said continuation 121. Actually the continuation 121 is formed simply by boring a recess in the said member of the same diameter as the chamber 103. Above the member 120 and overlying the same is a thinner member 122 of the same insulating material and rectangular dimensions. Said member 122 comprises an upper sandwiching member since it clamps the retarder plate 123 to the top of the member 120. Said retarder plate 123 is of glass or similar material and is inserted into a groove 124 formed in the top of the member 120, extending along the entire length thereof. The moisture collecting element is carried by the retarder plate in a manner which presently will be described.

The retarder plate 123 has its bottom surface in the path of the efflux from the jet or expansion valve 112 so that there is nothing between the moisture collecting element and the refrigerating chamber 122. The element will be designated collectively 126 but same is of compound formation as will be explained. Said moisture collecting element is the identical size as the diameter of the chamber 122 and there is a recess in the center of the member 122 forming the sample chamber 127 aligned with the refrigerating chamber 122.

I have mounted a valve supporting member 128 of cylindrical formation upon the top of the elongate member 122. Said valve supporting member is also of insulating material and has an inlet port 129 and an outlet port 130 to provide for passage of the gas sample into and out of the sampling chamber 127. The entire assembly of the valve supporting member 128, top sandwiching member 122, and the elongate member 122 are held upon the top of the housing 120 by a series of flat-headed screws 132 threaded into the said housing 120. The heads are countersunk in the surface of the valve supporting member 128 to permit free rotation of the valve 133.

The valve 133 is a mushroom shaped member having a knob 134 of disc-like formation adapted to be rotated on top of the member 128. The bottom of the member 133 has a depending stem 135 of a diameter tightly engaging within a suitable seat 136 formed in the member 128. The valve stem and the cylindrical seat are substantially the same diameter as the sample chamber 127. In order to give a general idea of the proportional dimensions of the device, the diameter of the chamber 127 is approximately ⅜ of an inch.

Said valve stem 135 is provided with a pair of vertical elongate passageways 136 and 137 for communication with the ports 129 and 130. There are short passageways horizontally arranged diametrically opposed to one another, each communicating with one of the vertical passageways. The passageways 138 and 139 communicate respectively with the vertical passageways 136 and 137. When the valve 133 is in place, the stem 135 extends down into the sampling chamber 127 a substantial distance. The passageways 138 and 139 are in the same plane as the ports 129 and 130 so that by proper orientation of the valve, the ports will be aligned with the passageways 138 and 139. Under these circumstances, gas entering the port 129 must pass down the passageway 137 into the sampling chamber 127 then up the passageway 136 and out the port 130. In this manner the path of the gas flow is tortuous.

It has been found that the gas must flow very slowly through the dew-point device in order that the determination be correct. Turbulence and too great a velocity of flow can give rise to false determinations. There must be a uniform transfer of heat from the vapor to the moisture collecting element in order to obtain true readings. It therefore will be obvious that it is essential that the gas flow through the chamber 127 be either very slow or have a zero velocity. I have found that by locking a sample in the chamber and making the determination the results are excellent. Accordingly the valve 133 is rotatable upon the member 128. In Fig. 9, the valve is shown in a position closing off the chamber 127 and in Fig. 10 the valve has been rotated 90° to enable gas to pass through the chamber. A pointer 140 on the valve knob 134 indicates the alignment of passageways 129 and 130. Suitable indicia (not shown) advantageously may be provided.

The dew-point measuring device illustrated in Figs. 6 to 12 inclusive is especially intended to be used with a temperature measuring device which includes a thermocouple and galvanometer. It has been found that it is advisable to keep the connections for the electrical leads to the representative parts of the thermocouple junction away from the cooling means to the end that false readings be eliminated. For this reason the members 120 and 122 are quite long compared with the size of the chamber 127. These members are clamped upon the glass retarder plate 123 by fastening means described and in addition by bolts 150 at the end corners thereof. The glass retarder plate 123 serves to keep the heat from escaping from the element 126 too rapidly; it diffuses the effect of the refrigeration coming through the plate from the chamber 121 so that the temperature of the element 126 is lowered evenly; and it serves as a mounting for the element.

Looking especially at Figs. 7, 11 and 12, the glass plate 123 extends the entire length of the members 120 and 123 and is sandwiched therebetween. As noted above, it is preferably set in a groove 124 of the member 120 but this is not essential. Along the center of the top surface of the glass plate 123 there are disposed the dissimilar metal members forming the thermocouple junction. Thus, from the left end to the center is a bismuth member 151 and from the right end to the center is an antimony member 152. The members are extremely thin and preferably of the order of a few ten thousandths of an inch in thickness. I have had success in depositing the members upon the glass by a vacuum vaporizing method in which the metal is vaporized in a vacuum and selectively deposited upon the desired surface. The metal may be mechanically secured or electrically deposited by any well-known techniques.

At their meeting ends, the metal members 151 and 152 are rounded and overlapped so that a good bonded contact therebetween is provided which is made up of a layer each of the dissimilar metals. This forms a round compound disc which is the junction 126. The diameter of the disc is equal to the diameter of the chamber 127 and the disc is so positioned that it aligns with the said chamber when the device is assembled.

It is a simple matter to have the metal members 151 and 152 protrude slightly beyond the ends of the glass plate 123 to provide lugs 154 and 155 to which the galvanometer leads 156 and 157 respectively may be brazed.

It is pointed out that the valve 133 is bodily removable from the member 128, enabling the chamber 127 to be cleaned out or dried after a run.

It is felt that no additional description is required since the device illustrated in Figs. 6 to 12 inclusive and described above operates much in the same manner as that previously referred to. It has the additional features involving the use of the valve structure and the thermocouple arrangement but is used in the same manner. The gas sample is run into the chamber 127, the chamber is locked if desired, the cooling device is set into operation, and the temperature of the juncture 126 is observed while the cooling proceeds. The temperature instrument, which may be a galvanometer, will give a smooth indication along a line 70 similar to that of the graph of Fig. 4 all the while that the element 126 is cooling but prior to its reaching the dew-point of the gas. When the indication is interrupted, as for example by showing a break in the smooth drop, the dew-point 71 has been reached and the temperature of this point is the desired information. Thereafter, the run may be continued to insure against the possibility of false indications, but for all purposes, the dew-point determination is complete.

The invention is admirably suited for use with recording instruments and detection circuits of great variety and flexibility. Electronic circuits are easily combined with the apparatus which will give suitable signals and indications only at the dew-point where there is an abrupt change in rate of drop of the temperature. Likewise, by the use of sensitive instruments great accuracy can be obtained with permanent records of temperature drop. For example many good recording galvanometers are available on the market for use with the invention.

It is also manifest that the particular apparatus described and claimed can be constructed with a variation of many details without departing from the scope of the invention as defined in the claims directed thereto.

I claim:

1. A dew-point measuring instrument which comprises a moisture collecting element, means for surrounding the said element with a gas sample, means for lowering the temperature of the said element at a smooth rate, whereby said element will have moisture condense thereon when the dew-point of the gas is reached, and said element being of such mass that its heat capacity is comparable to that of the initial condensate deposited thereon, and heat sensing means for detecting an abrupt change in said rate resulting from the liberation of the heat of condensation of said moisture at the dew-point.

2. A dew-point measuring instrument which comprises a moisture collecting element, means for surrounding the said element with a gas sample, means for lowering the temperature of the said element at a smooth rate, whereby said element will have moisture condense thereon when the dew-point of the gas is reached, and said element being of such mass that its heat capacity is comparable to that of the initial condensate deposited thereon, and means for detecting an abrupt change in said rate resulting from the liberation of the heat of condensation of said moisture at the dew-point, said detecting means including a temperature sensitive element, said temperature sensitive element also being the moisture collecting element.

3. A dew point measuring instrument which comprises moisture collecting means, means for surrounding said moisture collecting means with a gas sample, means for lowering the temperature of said moisture collecting means at a smooth rate, whereby said means will receive thereon condensate formed when the dew-point of the gas is reached and said means being of such mass that its heat capacity is comparable to that of the initial condensate received thereon, said temperature lowering means comprising a cooling device and a thermally insulative member having said moisture collecting means mounted on one side thereof, said cooling device and insulating member being so arranged as to cause a smooth exchange of heat between said moisture collecting means and said insulating member along the portion of said insulating member in contact with said moisture collecting means.

4. An instrument as described in claim 3 in which the thermally insulative member comprises a glass plate.

5. An instrument as described in claim 2 in which the temperature sensitive element comprises a thermocouple.

6. An instrument as described in claim 2 in which the temperature sensitive element comprises a resistance member.

7. An instrument as described in claim 2 in which the temperature sensitive element comprises a resistance member, and the detecting means includes a resistance bridge in which the resistance member is a leg.

8. A dew-point measuring instrument which comprises a housing having a gas sample chamber, a thermally insulative member at the bottom of the chamber adapted to have the lower surface thereof refrigerated, temperature-sensitive moisture collecting means mounted on the upper surface whereby to have condensate deposited on said means when the dew-point is reached, said moisture collecting means being of such a mass that its heat capacity is comparable to that of the initial moisture condensing thereon and arranged to lose heat slowly through said insulative member, and means connected with the collecting means for measuring the temperature of the said collecting means to detect the dew-point of the gas.

9. A dew-point measuring instrument which comprises a housing having a gas sample chamber, a thermally insulative member at the bottom of the chamber adapted to have the lower surface thereof refrigerated, temperature-sensitive moisture collecting means mounted on the upper surface whereby to have condensate deposited on said means when the dew-point is reached, said moisture collecting means being of such a mass that its heat capacity is comparable to that of the initial moisture condensing thereon and arranged to lose heat slowly through said insulative member, and means connected with the collecting means for measuring the temperature of the said collecting means to detect the dew-point of the gas, means for leading gas into said chamber, and means for locking a sample of the gas in said chamber.

10. A dew-point measuring instrument which comprises a housing having a gas sample chamber, a thermally insulative member at the bottom of the chamber adapted to have the lower surface thereof refrigerated, temperature-sensitive moisture collecting means mounted on the upper surface whereby to have condensate deposited on said means when the dew-point is reached, said moisture collecting means being of such a mass that its heat capacity is comparable to that of the initial moisture condensing thereon and arranged to lose heat slowly through said insulative member, and means connected with the collecting means for measuring the temperature of the said collecting means to detect the dew-point of the gas, means for leading gas into said chamber, and means for locking a sample of the gas in said chamber comprising a removable valve, said housing having inlet and outlet ports, and said valve having passageways aligned with said ports for leading the gas tortuously through the chamber, but being movable to block said ports.

11. A dew-point measuring instrument which comprises a housing having a gas sample chamber, a thermally insulative member at the bottom of the chamber adapted to have the lower surface thereof refrigerated, temperature-sensitive moisture collecting means mounted on the upper surface whereby to have condensate deposited on said means when the dew-point is reached, said moisture collecting means being of such a mass that its heat capacity is comparable to that of the initial moisture condensing thereon and arranged to lose heat slowly through said insulative member, and means connected with the collecting means for measuring the temperature of the said collecting means to detect the dew-point of the gas, said temperature sensitive means comprising a resistance element and said temperature measuring means comprising a detecting circuit having said element as a part thereof.

12. A dew-point measuring instrument which comprises a housing having a gas sample chamber, a thermally insulative member at the bottom of the chamber adapted to have the lower surface thereof refrigerated, temperature-sensitive moisture collecting means mounted on the upper surface whereby to have condensate deposited on said means when the dew-point is reached, said moisture collecting means being of such a mass that its heat capacity is comparable to that of the initial moisture condensing thereon and arranged to lose heat slowly through said insulative member, and means connected with the collecting means for measuring the temperature of the said collecting means to detect the dew-point of the gas, said temperature sensitive means comprising a thermocouple junction.

13. A dew-point measuring instrument which comprises a housing having a gas sample chamber, a thermally insulative member at the bottom of the chamber adapted to have the lower surface thereof refrigerated, temperature-sensitive moisture collecting means mounted on the upper surface whereby to have condensate deposited on said means when the dew-point is reached, said moisture collecting means being of such a mass that its heat capacity is comparable to that of the initial moisture condensing thereon and arranged to lose heat slowly through said insulative member, and means connected with the collecting means for measuring the temperature of the said collecting means to detect the dew-point of the gas, said temperature sensitive means comprising a thermocouple junction, the area of said junction being substantially the same as the cross sectional area of the said chamber.

14. A dew-point measuring instrument which comprises a housing having a gas sample chamber, a thermally insulative member at the bottom of the chamber adapted to have the lower surface thereof refrigerated, temperature-sensitive moisture collecting means mounted on the upper surface whereby to have condensate deposited on said means when the dew-point is reached, said moisture collecting means being of such a mass that its heat capacity is comparable to that of the initial moisture condensing thereon and arranged to lose heat slowly through said insulative member, and means connected with the collecting means for measuring the temperature of the said collecting means to detect the dew-point of the gas, said temperature sensitive means comprising a thermocouple junction of dissimilar metal members, each member being relatively elongate but having a relatively small portion thereof bonded to the other, there being electrical leads for connecting each of said members to said measuring means and said leads being respectively connected to said dissimilar metal members at points thereon not sensitive to temperature changes of the junction.

15. A dew-point meter which comprises a housing of insulating material having a gas sample chamber therein in which a gas is adapted to be received, a plate member of insulating material in the housing of generally elongate formation, said chamber being substantially smaller than the plate and overlying the center thereof, a pair of members each of dissimilar metal disposed upon the plate and extending each from an end to the center of the plate and being bonded to form a thermocouple junction at the center of the plate, a cooling device below the plate arranged to cool the junction whereby the temperature of the gas in the vicinity thereof will be cooled so as to cause a condensate to be deposited on said junction when the dew-point of the gas is reached, and electrical detecting means to measure and indicate temperature of the junction connected to the outer ends of the metal members, said junction having a mass such that its heat capacity is comparable to that of the initial condensate deposited thereon.

16. A meter as described in claim 15 in which the housing is provided with a passageway for the ingress and egress of said gas and said passageway including said chamber and being tortuous.

17. A meter as described in claim 15 in which the housing has inlet and outlet ports communicating with the chamber and there is a valve member having passageways adapted to be aligned with the said ports to permit the gas to enter and leave the chamber, and in which the valve member is movable to lock a sample of the gas in the chamber.

References Cited in the file of this patent

UNITED STATES PATENTS

| Number | Name | Date |
|---|---|---|
| 1,883,116 | Tomlinson | Oct. 18, 1932 |
| 2,281,418 | Deaton et al. | Apr. 28, 1942 |
| 2,536,111 | Van Dyke | Jan. 2, 1951 |
| 2,624,195 | Van Alen | Jan. 6, 1953 |

FOREIGN PATENTS

| Number | Country | Date |
|---|---|---|
| 632,680 | Germany | July 11, 1936 |